UNITED STATES PATENT OFFICE.

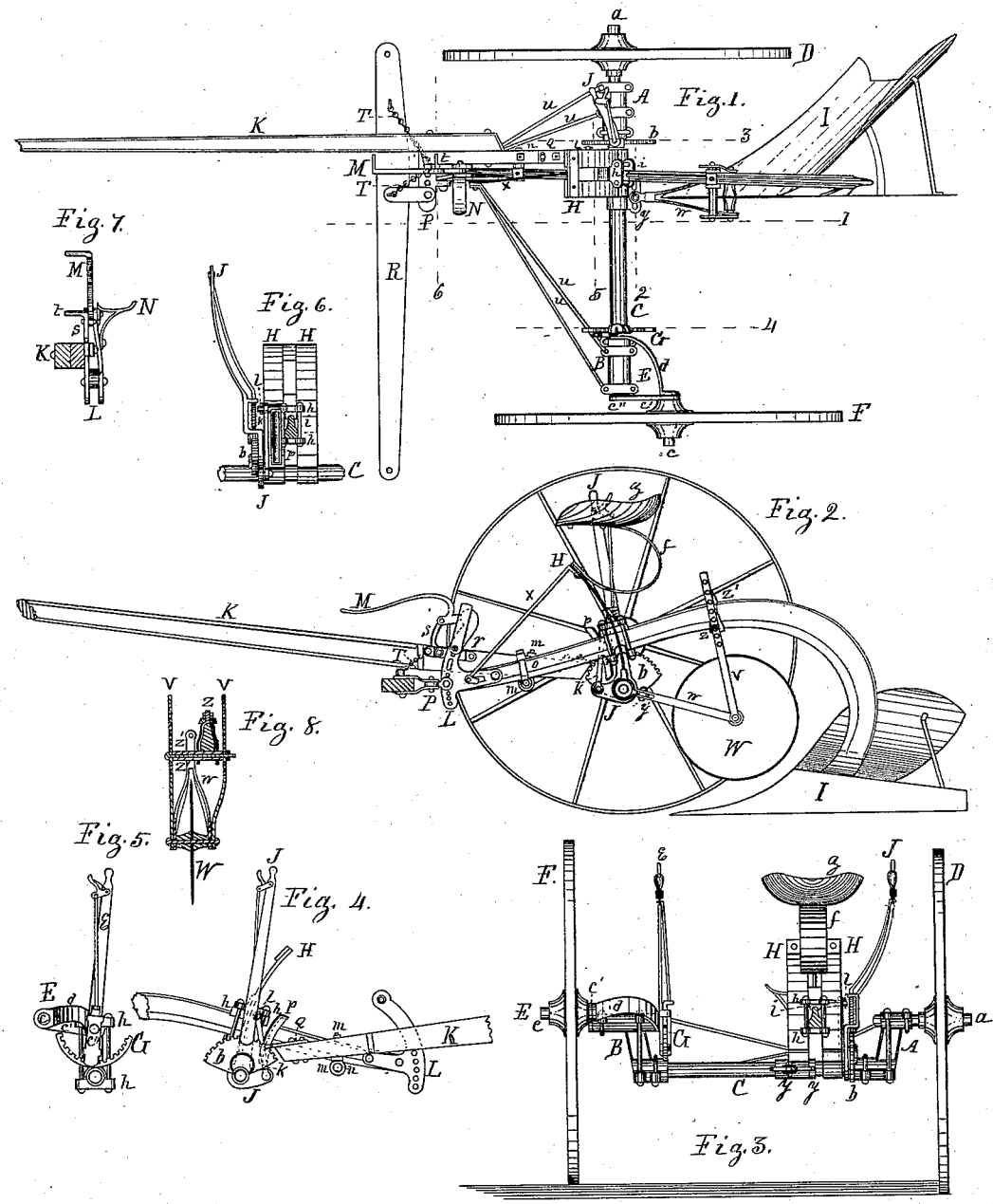

SILAS F. WOODWORTH, OF ROCKFORD, ILLINOIS.

IMPROVEMENT IN SULKY-PLOWS.

Specification forming part of Letters Patent No. 168,595, dated October 11, 1875; application filed August 2, 1875.

*To all whom it may concern:*

Be it known that I, SILAS F. WOODWORTH, of the city of Rockford and State of Illinois, have invented a Sulky-Plow, of which the following is a specification:

The object of my invention is to improve the sulky attachment for plows and the connection of the plow therewith, and devices for handling the plow; and consists in the devices and combinations of devices which I now proceed to describe.

In the drawing, Figure 1 is a plan view of my improved sulky-plow, in which the driver's seat is omitted. Fig. 2 is an elevation on dotted line 1. Fig. 3 is a rear elevation, with plow-beam in section, on dotted line 2. Fig. 4 is a view from right-hand side on dotted line 3. Fig. 5 is a view from right-hand side on dotted line 4. Fig. 6 is a front view of a central portion on dotted line 5. Fig. 7 is a front view on dotted line 6. Fig. 8 is a rear sectional view of the rolling colter.

A and B are bracket-arms fitted with caps, forming cylindrical boxes, substantially such as are used for shafting in common machinery. Their lower ends receive the ends of the central and underhanging portions C of the axle, on which are erected in a rigid manner the curved guides $h$, between which the plow I is held on the axle in a fixed position laterally, its beam being fitted to slide vertically between the curved guides. The upper end of bracket-arm A receives the axle-arm $a$, on which the wheel D revolves, and is adjustable in the box in the bracket-arm, for the purpose of adapting the carriage to work plows cutting different width furrows, and adjusting the wheel to track near the land edge of the furrow. The bracket-arm A is formed with a segment-toothed ratchet, $b$, on its inner end, which rises above and stands crosswise on the portion C of the axle. These parts are held in place by bolts and stirrup-bolts connecting the parts, which also provide the ready means for the lateral adjustment of the wheel D. E is a crank-formed lever axle-arm, composed of arms $c\ c'\ c''$, curved brace $d$, and lever $e$, all of which are rigidly secured to each other, forming a single part, the arm $c$ of which is fitted to receive the carrying-wheel F, on which it revolves. The arm $c''$ is fitted to and has its fulcrum-bearing in the box in the upper end of bracket-arm B, which, with its caps and an internally-toothed segment-ratchet, G, is firmly held in place on the underhanging portion C of the axle by bolts and stirrup-bolts connecting the parts. The lever $e$ is fitted with a spring-pawl to engage the teeth in the segment G, which is operated by means of a thumb-lever hinged to lever $e$.

The object of this part of my invention is to raise and lower the carrying-wheel F, and hold it in position for the purpose of leveling the carriage in plowing deep or shallow, and in transporting the machine.

H are radial curved guides, rigidly secured to the underhanging axle $c$, to the upper ends of which is secured the curved spring-bar $f$, which supports the driver's seat $g$. I is a plow of the usual construction, and is of the class known in the trade as the steel-beam plow, and is fitted with a screw-bolt-clamping device, $h$, to embrace the beam, which is provided with a grooved saddle-block, $i$, fitted to the conformation of the upper surface of the beam, and is held in position on the beam by means of the clamping-bolts, and is fitted to slide between the radial curved guide-bars H, in such a manner as to hold the plow in a vertical position. J is an angle-lever, having its fulcrum bearing on the underhanging axle, and is fitted with a spring-pawl to engage the teeth in the segment-toothed ratchet $b$, operated by a thumb-lever pivoted to the lever J. The forward angle portion of lever J is connected by a link, $k$, to the screw-bolt-clamping device $h$ on a projecting stud, $l$. The object of this part of my invention is to raise and lower the plow to cut furrows of different depth, and to raise the plow clear of the ground in turning and in transportation. K is the tongue, composed of two parts connected by lap-joint, held in place by screw-bolts, and is hinged to the plow-beam between the axle and the clevis by an eyebolt, $m$, on trunnion $n$, secured to the plow-beam by a yoke screw-clamp, $o$. The rear end of the tongue is provided with a guide-piece, to slide in the groove in curved guideway $p$, which is secured to the screw-clamping device $h$. L is a clevis secured to the forward end of the plow-beam, and is provided with a series of holes for the vertical adjustment of the secondary clevis P, and is also provided with upward projecting radial arms, one of which is fitted to slide vertically in a slide-loop, $r$, secured to the tongue. M is a lever of the peculiar form represented in the drawings, pivoted between the upper ends of the radial arms of the clevis L, and is connected by a curved link, $s$, pivoted to the lever M and tongue K in such a manner that when the lever is raised up and thrown back it will be locked and self-sustaining.

The link $s$ is provided with a foot-pedal, $t$, by means of which the driver can unlock the levers with a forward movement of his foot. N is a foot-rest, which is vertically adjustable on the radial upward extensions of the clevis L. The object of this part of my invention is, first, to permit of a free vertical movement of the tongue without affecting the position of the plow or the carriage; and, secondly, to enable the driver, by means of the foot-rest N, with or without the aid of the lever M, or by means of the lever M independently of the foot-rest N, to tilt the plow on the carriage, for the purpose of raising the plow and locking it in such raised position, from which it may be dropped by the action of the foot on the pedal $t$, or by the hand by means of the lever M. P is a secondary clevis, connected to the clevis L in the usual manner, and is adjustable vertically thereon, for the purpose of regulating the running depth of the plow. R is a three-horse evener, and is connected to the clevis P by the usual strap-connection, and is laterally adjustable on clevis P, which is provided with a series of holes, for the purpose of regulating the width of furrow cut by the plow. T is a chain, connected to the tongue and to the evener at two points, in such a manner that when the plow is tilted by means of the lever M, they will sustain the evener in nearly a horizontal position, and so as to balance the unequal weight of the ends of the whiffletrees. $u$ are braces connecting the carriage with the forward end of the plow-beam, for the purpose of holding them in position relatively. $x$ is a brace connecting the forward end of the plow-beam with the curved guideway H, for the purpose of holding them in position relatively. W is a rolling colter of usual form, hung to revolve in the yoke $w$, which is connected to a clevis, $y$, on axle $c$, and is adjustable laterally thereon. Bars $v$ are connected to the axle of the colter, and extend upward, and are loosely connected to a tube, $z$, by a bolt passing through the bars and tube. The tube $z$ is firmly secured to the plow-beam by a screw-clamping yoke, $z'$, by means of which the colter is held in position on the plow-beam, and is laterally adjustable thereon by means of the tube and screw-clamping yoke. The bars $v$ are provided with a series of holes, for the purpose of vertical adjustment of the colter. The guide-piece Q on the rear end of the tongue K is fitted with a transverse slot, provided with a screw-clamping bolt, by means of which the forward end of the tongue may be adjusted laterally, for the purpose of causing the plow to cut furrows of greater or less width.

I have represented my invention in connection with a steel-beamed plow, but do not wish to confine myself to this particular kind of plow, as it is evident that any plow of ordinary construction may be used by adapting the parts to receive the beam of any of the common or known forms now in use. I have also, preferably, used tubing in the construction of the axle; but solid bars may be used instead.

I claim as my invention—

1. The crank-formed lever axle-arm E, composed of arms $c$ $c'$ $c''$, brace $d$, and lever $e$, in combination with the internally-toothed segment-ratchet G, as and for the purpose set forth.

2. The combination of the angle-lever J, segment-toothed ratchet $b$, link $k$, screw-clamping device $h$, and curved guide-bars H, for the purpose of raising and lowering the plow, and holding it in position, substantially as shown and described.

3. The tongue K, hinged to the plow-beam between the axle and the clevis, substantially as described, in combination with the guide-plate Q, secured to the rear end of the tongue, to work in the grooved curved guideway $p$, secured to the clamping device $h$, the upward-projecting radial arm of clevis L, fitted to slide in loop $r$ on tongue K, all these members being constructed and arranged to operate substantially as described, for the purpose of holding the tongue rigid with the plow-beam laterally, and to permit of a free independent vertical movement, as described and shown.

4. The lever M and link $s$, in combination with the tongue K and clevis L, for the purpose of tilting the plow on the axle, and holding it in the tilted position, substantially as described.

5. The colter W, yoke $w$, clevis $y$, bars $v$, tube $z$, and yoke $i$, in combination with the axle and plow-beams adjustable thereon, as described.

SILAS F. WOODWORTH.

Witnesses:
JULIUS MAYR,
MARQUIS L. GORHAM.